United States Patent
Oren

(10) Patent No.: US 9,718,610 B2
(45) Date of Patent: Aug. 1, 2017

(54) PROPPANT DISCHARGE SYSTEM HAVING A CONTAINER AND THE PROCESS FOR PROVIDING PROPPANT TO A WELL SITE

(75) Inventor: John Oren, Houston, TX (US)

(73) Assignee: Oren Technologies, LLC, Houston, TX (US)

( * ) Notice: Subject to any disclaimer, the term of this patent is extended or adjusted under 35 U.S.C. 154(b) by 58 days.

(21) Appl. No.: 13/555,635

(22) Filed: Jul. 23, 2012

(65) Prior Publication Data

US 2014/0020765 A1    Jan. 23, 2014

(51) Int. Cl.
*B65D 88/30*    (2006.01)
*F17D 1/00*    (2006.01)
*B65D 90/62*    (2006.01)

(52) U.S. Cl.
CPC ........... *B65D 88/30* (2013.01); *B65D 90/626* (2013.01); *F17D 1/00* (2013.01); *Y10T 137/0318* (2015.04); *Y10T 137/4891* (2015.04)

(58) Field of Classification Search
CPC .................................. B65F 9/00; B65G 67/20
USPC ................................................. 414/800, 809
See application file for complete search history.

(56) References Cited

U.S. PATENT DOCUMENTS

| | | | |
|---|---|---|---|
| 137,871 A | 4/1873 | Worsley |
| 150,894 A | 5/1874 | Safely |
| 384,443 A | 6/1888 | Hoover |
| 448,238 A | 3/1891 | Johnson |
| 711,632 A | 10/1902 | Johnson |
| 917,649 A | 4/1909 | Otto |
| 1,143,641 A | 6/1915 | McGregor |
| 1,331,883 A | 2/1920 | Stuart |
| 1,344,768 A | 6/1920 | Messiter |
| 1,434,488 A | 11/1922 | Forsythe et al. |
| 1,520,560 A | 12/1923 | Burno |
| 1,506,936 A | 9/1924 | Lea |
| 1,526,527 A | 2/1925 | Butler |
| 1,573,664 A | 2/1926 | Wetherill |

(Continued)

FOREIGN PATENT DOCUMENTS

| | | |
|---|---|---|
| CA | 2023138 | 2/1992 |
| CA | 2791088 | 3/2013 |

(Continued)

OTHER PUBLICATIONS

International Search Report for related International Application No. PCT/US2012/066639.

(Continued)

*Primary Examiner* — Jonathan Snelting
(74) *Attorney, Agent, or Firm* — Hogan Lovells US LLP

(57) ABSTRACT

A proppant discharge system includes a container having an outlet formed at a bottom thereof, a gate affixed at the outlet and positioned on the floor of the container so as to be movable between a first position covering the outlet to a second position opening the outlet, a support structure having the container positioned on the top surface thereof. The support structure has at least one actuator affixed thereto. The actuator is positioned so as to move the gate between the first position and the second position. The container has a cage affixed on the floor thereof in a position over the outlet. The gate is positioned within the cage and is movable by the actuator so as to open the gate so as to allow proppant to be discharged therefrom.

14 Claims, 6 Drawing Sheets

(56) References Cited

U.S. PATENT DOCUMENTS

| | | | |
|---|---|---|---|
| 1,807,447 A | 5/1931 | Smith | |
| 1,850,000 A | 3/1932 | Fernand | |
| 1,932,320 A | 10/1933 | Steward | |
| 1,973,312 A | 9/1934 | Hardinge | |
| 2,233,005 A | 2/1941 | Garlinghouse | |
| 2,255,448 A | 9/1941 | Morris | |
| 2,293,160 A | 8/1942 | Miller et al. | |
| 2,368,672 A | 2/1945 | McNamara | |
| 2,381,103 A | 8/1945 | Frank | |
| 2,423,879 A | 7/1947 | De Frees | |
| 2,564,020 A | 8/1951 | Mengel | |
| 2,603,342 A | 7/1952 | Martinson | |
| 2,616,758 A | 11/1952 | Meyers | |
| 2,622,771 A | 12/1952 | Tulou | |
| 2,652,174 A | 9/1953 | Shea et al. | |
| 2,678,145 A | 5/1954 | Ejuzwiak et al. | |
| 2,693,282 A | 11/1954 | Sensibar | |
| 2,700,574 A | 1/1955 | Tourneau | |
| 2,792,262 A | 4/1955 | Hathorn | |
| 2,774,515 A | 12/1956 | Johansson et al. | |
| 2,791,973 A | 5/1957 | Dorey | |
| 2,801,125 A | 7/1957 | Page et al. | |
| 2,808,164 A | 10/1957 | Glendinning | |
| 2,812,970 A | 11/1957 | Martinson | |
| 2,837,369 A | 6/1958 | Stopps | |
| 2,865,521 A | 12/1958 | Fisher et al. | |
| 2,873,036 A | 2/1959 | Noble | |
| 2,894,666 A | 7/1959 | Campbell, Jr. | |
| 2,988,235 A | 6/1961 | Ronyak | |
| 2,994,460 A | 8/1961 | Matthews | |
| 3,049,248 A | 8/1962 | Heltzel et al. | |
| 3,064,832 A | 11/1962 | Heltzel | |
| 3,083,879 A | 4/1963 | Coleman | |
| 3,090,527 A | 5/1963 | Rensch | |
| 3,109,389 A | 11/1963 | Karlsson | |
| 3,122,258 A | 2/1964 | Raymond | |
| 3,135,432 A | 6/1964 | McKinney | |
| 3,163,127 A | 12/1964 | Gutridge et al. | |
| 3,187,684 A | 6/1965 | Ortner | |
| 3,198,494 A | 8/1965 | Curran et al. | |
| 3,199,585 A | 8/1965 | Cronberger | |
| 3,248,026 A | 4/1966 | Kemp | |
| 3,255,927 A | 6/1966 | Ruppert et al. | |
| 3,265,443 A | 8/1966 | Simas | |
| 3,270,921 A | 9/1966 | Nadolske et al. | |
| 3,281,006 A | 10/1966 | Wei | |
| 3,294,306 A | 12/1966 | Areddy | |
| 3,318,473 A | 5/1967 | Jones et al. | |
| 3,353,599 A | 11/1967 | Swift | |
| 3,354,918 A | 11/1967 | Coleman | |
| 3,378,152 A | 4/1968 | Warner | |
| 3,387,570 A | 6/1968 | Pulcrano et al. | |
| 3,396,675 A | 8/1968 | Stevens | |
| 3,397,654 A | 8/1968 | Snyder | |
| 3,406,995 A | 10/1968 | McCarthy | |
| 3,407,971 A | 10/1968 | Oehler | |
| 3,425,599 A | 2/1969 | Sammarco et al. | |
| 3,455,474 A | 7/1969 | Truncali | |
| 3,524,567 A | 8/1970 | Coleman | |
| 3,528,570 A | 9/1970 | Pase | |
| 3,561,633 A | 2/1971 | Morrison et al. | |
| 3,587,834 A | 6/1971 | Dugge | |
| 3,596,609 A | 8/1971 | Ortner | |
| 3,601,244 A | 8/1971 | Ort et al. | |
| 3,602,400 A | 8/1971 | Cooke | |
| 3,650,567 A | 3/1972 | Danielson | |
| 3,653,521 A | 4/1972 | Bridge | |
| 3,661,293 A | 5/1972 | Gerhard et al. | |
| 3,692,363 A | 9/1972 | Tenebaum et al. | |
| 3,704,797 A | 12/1972 | Suykens | |
| 3,721,199 A | 3/1973 | Hassenauer | |
| 3,729,121 A | 4/1973 | Cannon | |
| 3,734,215 A | 5/1973 | Smith | |
| 3,738,511 A | 6/1973 | Lemon et al. | |
| 3,777,909 A | 12/1973 | Rheinfrank | |
| 3,785,534 A | 1/1974 | Smith | |
| 3,800,712 A | 4/1974 | Krug, Jr. | |
| 3,802,584 A | 4/1974 | Sackett | |
| 3,817,261 A | 6/1974 | Rogge | |
| 3,820,762 A | 6/1974 | Bostrom et al. | |
| 3,827,578 A | 8/1974 | Hough | |
| 3,840,141 A | 10/1974 | Allom et al. | |
| 3,854,612 A | 12/1974 | Snape | |
| 3,861,716 A | 1/1975 | Baxter et al. | |
| 3,883,005 A | 5/1975 | Stevens | |
| 3,933,100 A | 1/1976 | Dugge | |
| 3,970,123 A | 7/1976 | Poulton et al. | |
| 3,986,708 A | 10/1976 | Heltzel et al. | |
| 3,997,089 A | 12/1976 | Clarke et al. | |
| 4,003,301 A | 1/1977 | Norton | |
| 4,004,700 A | 1/1977 | Empey | |
| 4,057,153 A | 11/1977 | Weaver | |
| 4,058,239 A | 11/1977 | Van Mill | |
| 4,063,656 A | 12/1977 | Lambert | |
| 4,073,410 A | 2/1978 | Melcher | |
| 4,138,163 A | 2/1979 | Calvert et al. | |
| 4,178,117 A | 12/1979 | Brugler | |
| 4,204,773 A | 5/1980 | Bates | |
| 4,210,273 A | 7/1980 | Hegele | |
| 4,210,963 A | 7/1980 | Ricciardi et al. | |
| RE30,358 E | 8/1980 | Sensibar | |
| 4,222,498 A | 9/1980 | Brock | |
| 4,227,732 A | 10/1980 | Kish | |
| 4,232,884 A | 11/1980 | DeWitt | |
| 4,239,424 A | 12/1980 | Pavolka | |
| 4,247,228 A | 1/1981 | Gray et al. | |
| 4,258,953 A | 3/1981 | Johnson | |
| 4,265,266 A | 5/1981 | Kierbow et al. | |
| 4,278,190 A | 7/1981 | Oory et al. | |
| 4,282,988 A | 8/1981 | Hulbert, Jr. | |
| 4,287,921 A | 9/1981 | Sanford | |
| 4,287,997 A | 9/1981 | Rolfe et al. | |
| 4,289,353 A | 9/1981 | Merritt | |
| 4,299,597 A | 11/1981 | Oetiker et al. | |
| 4,306,895 A | 12/1981 | Thompson et al. | |
| 4,329,106 A | 5/1982 | Adler | |
| 4,350,241 A | 9/1982 | Wenzel | |
| 4,359,176 A | 11/1982 | Johnson | |
| 4,363,396 A | 12/1982 | Wolf et al. | |
| 4,397,406 A | 8/1983 | Croley | |
| 4,398,653 A | 8/1983 | Daloisio | |
| 4,402,392 A | 9/1983 | Fabian et al. | |
| 4,407,202 A | 10/1983 | McCormick | |
| 4,408,886 A | 10/1983 | Sampson et al. | |
| 4,410,106 A | 10/1983 | Kierbow et al. | |
| 4,427,133 A | 1/1984 | Kierbow et al. | |
| 4,428,504 A | 1/1984 | Bassett et al. | |
| 4,449,861 A | 5/1984 | Saito et al. | |
| 4,453,645 A | 6/1984 | Usui et al. | |
| 4,474,204 A | 10/1984 | West | |
| 4,475,672 A | 10/1984 | Whitehead | |
| 4,478,155 A | 10/1984 | Cena et al. | |
| 4,483,462 A | 11/1984 | Heintz | |
| 4,525,071 A | 6/1985 | Horowitz | |
| 4,532,098 A | 7/1985 | Campbell | |
| 4,569,394 A | 2/1986 | Sweatman et al. | |
| 4,571,143 A | 2/1986 | Hellerich | |
| 4,608,931 A | 9/1986 | Ruhmann et al. | |
| 4,619,531 A | 10/1986 | Dunstan | |
| 4,626,155 A | 12/1986 | Hlinsky et al. | |
| 4,626,166 A | 12/1986 | Jolly | |
| 4,628,825 A | 12/1986 | Taylor et al. | |
| 4,660,733 A | 4/1987 | Snyder et al. | |
| 4,701,095 A | 10/1987 | Berryman et al. | |
| 4,715,754 A | 12/1987 | Scully | |
| 4,738,774 A | 4/1988 | Patrick | |
| 4,741,273 A | 5/1988 | Sherwood | |
| 4,801,389 A | 1/1989 | Brannon et al. | |
| 4,819,830 A | 4/1989 | Schultz | |
| 4,848,605 A | 7/1989 | Wise | |
| 4,882,784 A | 11/1989 | Tump | |
| 4,889,219 A | 12/1989 | Key | |
| 4,901,649 A | 2/1990 | Fehrenbach et al. | |
| 4,909,378 A | 3/1990 | Webb | |

(56) References Cited

U.S. PATENT DOCUMENTS

| | | |
|---|---|---|
| 4,909,556 A | 3/1990 | Koskinen |
| 4,917,019 A | 4/1990 | Hesch et al. |
| 4,919,583 A | 4/1990 | Speakman, Jr. |
| 4,923,358 A | 5/1990 | Van Mill |
| 4,946,068 A | 8/1990 | Erickson et al. |
| 4,947,760 A | 8/1990 | Dawson et al. |
| 4,954,975 A | 9/1990 | Kalata |
| 4,956,821 A | 9/1990 | Fenelon |
| 4,975,205 A | 12/1990 | Sloan |
| 4,995,522 A | 2/1991 | Barr |
| 5,004,400 A | 4/1991 | Handke |
| 5,042,538 A | 8/1991 | Wiese |
| 5,069,352 A | 12/1991 | Harbolt et al. |
| 5,080,259 A | 1/1992 | Hadley |
| 5,082,304 A | 1/1992 | Preller et al. |
| 5,102,281 A | 4/1992 | Handke |
| 5,102,286 A | 4/1992 | Fenton |
| 5,105,858 A | 4/1992 | Levinson |
| 5,131,524 A | 7/1992 | Uehara |
| 5,190,182 A | 3/1993 | Copas et al. |
| 5,195,861 A | 3/1993 | Handke |
| 5,199,826 A | 4/1993 | Lawrence |
| 5,201,546 A | 4/1993 | Lindsay |
| 5,224,635 A | 7/1993 | Wise |
| 5,253,746 A | 10/1993 | Friesen et al. |
| 5,253,776 A | 10/1993 | Decroix et al. |
| 5,265,763 A | 11/1993 | Heinrici et al. |
| 5,286,158 A | 2/1994 | Zimmerman |
| 5,290,139 A | 3/1994 | Hedrick |
| 5,320,046 A | 6/1994 | Hesch |
| 5,324,097 A | 6/1994 | Decap |
| 5,339,996 A | 8/1994 | Dubbert |
| 5,345,982 A | 9/1994 | Nadeau et al. |
| 5,358,137 A | 10/1994 | Shuert et al. |
| 5,373,792 A | 12/1994 | Pileggi et al. |
| 5,402,915 A | 4/1995 | Hogan |
| 5,413,154 A * | 5/1995 | Hurst, Jr. ............... B28C 7/0481 141/105 |
| 5,429,259 A | 7/1995 | Robin |
| 5,441,321 A | 8/1995 | Karpisek |
| 5,445,289 A | 8/1995 | Owen |
| 5,465,829 A | 11/1995 | Kruse |
| 5,470,175 A | 11/1995 | Jensen et al. |
| 5,493,852 A | 2/1996 | Stewart |
| 5,538,286 A | 7/1996 | Hoff |
| 5,549,278 A | 8/1996 | Sidler |
| 5,564,599 A | 10/1996 | Barber et al. |
| 5,570,743 A | 11/1996 | Padgett et al. |
| 5,590,976 A | 1/1997 | Kilheffer et al. |
| 5,601,181 A | 2/1997 | Lindhorst |
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |
| 5,687,881 A | 11/1997 | Rouse et al. |
| 5,690,466 A | 11/1997 | Gaddis et al. |
| 5,697,535 A | 12/1997 | Coleman |
| 5,706,614 A | 1/1998 | Wiley et al. |
| 5,718,555 A | 2/1998 | Swalheim |
| 5,722,552 A | 3/1998 | Olson |
| 5,761,854 A | 6/1998 | Johnson et al. |
| 5,762,222 A | 6/1998 | Liu |
| 5,772,390 A | 6/1998 | Walker |
| 5,782,524 A | 7/1998 | Heider et al. |
| 5,785,421 A | 7/1998 | Milek |
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,906,471 A | 5/1999 | Schwoerer |
| 5,911,337 A | 6/1999 | Bedeker |
| 5,927,558 A | 7/1999 | Bruce |
| 5,971,219 A | 10/1999 | Karpisek |
| 5,993,202 A | 11/1999 | Yamazaki et al. |
| 6,002,063 A | 12/1999 | Bilak et al. |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,247,594 B1 | 6/2001 | Garton |
| 6,263,803 B1 | 7/2001 | Dohr et al. |
| 6,269,849 B1 | 8/2001 | Fields |
| 6,273,154 B1 | 8/2001 | Laug |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Ostman |
| 6,328,183 B1 | 12/2001 | Coleman |
| 6,364,584 B1 | 4/2002 | Taylor |
| 6,374,915 B1 | 4/2002 | Andrews |
| 6,382,446 B1 | 5/2002 | Hinkle et al. |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,425,725 B1 | 7/2002 | Ehlers |
| 6,457,291 B2 | 10/2002 | Wick |
| 6,505,760 B1 | 1/2003 | Werner |
| 6,508,387 B1 | 1/2003 | Simon et al. |
| 6,508,615 B2 | 1/2003 | Taylor |
| 6,523,482 B2 | 2/2003 | Wingate |
| 6,537,002 B2 | 3/2003 | Gloystein |
| 6,575,614 B2 | 6/2003 | Tosco et al. |
| 6,660,693 B2 | 12/2003 | Miller et al. |
| 6,663,373 B2 | 12/2003 | Yoshida |
| 6,666,573 B2 | 12/2003 | Grassi |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B2 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 | 9/2006 | Le Roy |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Saik |
| 7,252,309 B2 * | 8/2007 | Eng Soon et al. ......... 222/185.1 |
| 7,284,579 B2 | 10/2007 | Elgan et al. |
| 7,284,670 B2 | 10/2007 | Schmid |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |

(56) References Cited

U.S. PATENT DOCUMENTS

| | | | |
|---|---|---|---|
| 7,513,280 B2 | 4/2009 | Brashears et al. | |
| 7,591,386 B2 | 9/2009 | Hooper | |
| 7,640,075 B2 | 12/2009 | Wietgrefe | |
| 7,695,538 B2 | 4/2010 | Cheng | |
| 7,753,637 B2 | 7/2010 | Benedict et al. | |
| 7,798,558 B2 | 9/2010 | Messier | |
| 7,802,958 B2 | 9/2010 | Garcia et al. | |
| 7,803,321 B2 | 9/2010 | Lark et al. | |
| 7,837,427 B2* | 11/2010 | Beckel et al. | 414/801 |
| 7,841,394 B2 | 11/2010 | McNeel et al. | |
| 7,845,516 B2 | 12/2010 | Pessin et al. | |
| 7,858,888 B2 | 12/2010 | Lucas et al. | |
| 7,891,304 B2 | 2/2011 | Herzog et al. | |
| 7,891,523 B2 | 2/2011 | Mehus et al. | |
| 7,896,198 B2 | 3/2011 | Mehus et al. | |
| 7,921,783 B2 | 4/2011 | Forbes et al. | |
| 7,967,161 B2 | 6/2011 | Townsend | |
| 7,980,803 B2 | 7/2011 | Brandstatter et al. | |
| 7,997,623 B2 | 8/2011 | Williams | |
| 8,083,083 B1 | 12/2011 | Mohns | |
| 8,201,520 B2 | 6/2012 | Meritt | |
| 8,313,278 B2 | 11/2012 | Simmons et al. | |
| 8,366,349 B2 | 2/2013 | Beachner | |
| 8,375,690 B2 | 2/2013 | LaFargue et al. | |
| 8,379,927 B2 | 2/2013 | Taylor | |
| 8,387,824 B2 | 3/2013 | Wietgrefe | |
| 8,393,502 B2 | 3/2013 | Renyer et al. | |
| 8,424,666 B2 | 4/2013 | Berning et al. | |
| D688,351 S | 8/2013 | Oren | |
| 8,505,780 B2 | 8/2013 | Oren | |
| 8,544,419 B1 | 10/2013 | Spalding et al. | |
| 8,545,148 B2 | 10/2013 | Wanek-Pusset et al. | |
| 8,562,022 B2 | 10/2013 | Nadeau et al. | |
| 8,573,387 B2 | 11/2013 | Trimble | |
| 8,573,917 B2 | 11/2013 | Renyer | |
| 8,585,341 B1 | 11/2013 | Oren | |
| D694,670 S | 12/2013 | Oren | |
| 8,616,370 B2 | 12/2013 | Allegretti | |
| 8,622,251 B2 | 1/2014 | Oren | |
| 8,636,832 B2 | 1/2014 | Stutzman et al. | |
| 8,646,641 B2 | 2/2014 | Moir | |
| 8,668,430 B2 | 3/2014 | Oren | |
| D703,582 S | 4/2014 | Oren | |
| 8,820,559 B2 | 9/2014 | Beitler et al. | |
| 8,827,118 B2 | 9/2014 | Oren | |
| 8,887,914 B2 | 11/2014 | Allegretti | |
| 8,905,266 B2 | 12/2014 | De Brabanter | |
| 8,915,691 B2 | 12/2014 | Mintz | |
| 9,051,801 B1 | 6/2015 | Mintz | |
| 9,052,034 B1 | 6/2015 | Wegner et al. | |
| 9,267,266 B2 | 2/2016 | Cutler et al. | |
| 2001/0022308 A1 | 9/2001 | Epp et al. | |
| 2001/0045338 A1 | 11/2001 | Ransil et al. | |
| 2002/0134550 A1 | 9/2002 | Leeson et al. | |
| 2002/0139643 A1 | 10/2002 | Peltier et al. | |
| 2003/0006248 A1 | 1/2003 | Gill et al. | |
| 2003/0111470 A1 | 6/2003 | Fouillet et al. | |
| 2003/0145418 A1 | 8/2003 | Ikeda et al. | |
| 2003/0156929 A1 | 8/2003 | Russell | |
| 2004/0065699 A1 | 4/2004 | Schoer et al. | |
| 2004/0074922 A1 | 4/2004 | Bothor et al. | |
| 2004/0084874 A1 | 5/2004 | McDougall | |
| 2004/0206646 A1 | 10/2004 | Goh | |
| 2004/0245284 A1 | 12/2004 | Mehus et al. | |
| 2005/0158158 A1 | 7/2005 | Porta | |
| 2005/0201851 A1 | 9/2005 | Jonkka | |
| 2006/0012183 A1 | 1/2006 | Marchiori et al. | |
| 2006/0027582 A1 | 2/2006 | Beach | |
| 2006/0053582 A1 | 3/2006 | Engel et al. | |
| 2006/0091072 A1 | 5/2006 | Schmid et al. | |
| 2006/0151058 A1 | 7/2006 | Salaoras et al. | |
| 2006/0180062 A1 | 8/2006 | Furrer et al. | |
| 2006/0180232 A1* | 8/2006 | Glewwe et al. | 141/2 |
| 2006/0239806 A1 | 10/2006 | Yelton | |
| 2006/0267377 A1 | 11/2006 | Lusk et al. | |
| 2006/0277783 A1 | 12/2006 | Garton | |
| 2006/0289166 A1 | 12/2006 | Stromquist et al. | |
| 2007/0096537 A1 | 5/2007 | Hicks | |
| 2007/0125543 A1 | 6/2007 | McNeel et al. | |
| 2008/0008562 A1 | 1/2008 | Beckel et al. | |
| 2008/0029546 A1 | 2/2008 | Schuld | |
| 2008/0029553 A1 | 2/2008 | Culleton | |
| 2008/0179054 A1 | 7/2008 | McGough et al. | |
| 2008/0179324 A1 | 7/2008 | McGough et al. | |
| 2008/0213073 A1 | 9/2008 | Benedict et al. | |
| 2008/0226434 A1* | 9/2008 | Smith | B65D 88/022 414/332 |
| 2008/0264641 A1 | 10/2008 | Slabaugh et al. | |
| 2008/0277423 A1 | 11/2008 | Garton | |
| 2009/0038242 A1 | 2/2009 | Cope | |
| 2009/0078410 A1* | 3/2009 | Krenek | E21B 43/267 166/244.1 |
| 2009/0278326 A1 | 11/2009 | Rowland et al. | |
| 2010/0021258 A1 | 1/2010 | Kim | |
| 2010/0037572 A1 | 2/2010 | Cheng | |
| 2010/0038143 A1 | 2/2010 | Burnett et al. | |
| 2010/0040446 A1 | 2/2010 | Renyer | |
| 2010/0065466 A1 | 3/2010 | Perkins | |
| 2010/0108711 A1 | 5/2010 | Wietgrefe | |
| 2010/0129193 A1 | 5/2010 | Sherrer | |
| 2010/0278621 A1 | 11/2010 | Redekop | |
| 2010/0288603 A1 | 11/2010 | Schafer | |
| 2011/0011893 A1 | 1/2011 | Cerny | |
| 2011/0017693 A1 | 1/2011 | Thomas | |
| 2011/0101040 A1 | 5/2011 | Weissbrod | |
| 2011/0109703 A1 | 5/2011 | Koseki | |
| 2011/0127178 A1 | 6/2011 | Claussen | |
| 2011/0160104 A1 | 6/2011 | Wu et al. | |
| 2011/0162838 A1 | 7/2011 | Mackenzie et al. | |
| 2011/0168593 A1 | 7/2011 | Neufeld et al. | |
| 2011/0222983 A1 | 9/2011 | Dugic et al. | |
| 2011/0297702 A1 | 12/2011 | Hildebrandt et al. | |
| 2012/0103848 A1 | 5/2012 | Allegretti et al. | |
| 2012/0219391 A1 | 8/2012 | Teichrob et al. | |
| 2012/0255539 A1 | 10/2012 | Kolecki | |
| 2013/0004272 A1 | 1/2013 | Mintz | |
| 2013/0022441 A1 | 1/2013 | Uhryn et al. | |
| 2013/0206415 A1 | 8/2013 | Sheesley | |
| 2013/0209204 A1 | 8/2013 | Sheesley | |
| 2013/0233545 A1 | 9/2013 | Mahoney | |
| 2013/0284729 A1 | 10/2013 | Cook et al. | |
| 2013/0309052 A1 | 11/2013 | Luharuka | |
| 2013/0323005 A1 | 12/2013 | Rexius et al. | |
| 2014/0020765 A1 | 1/2014 | Oren | |
| 2014/0020892 A1 | 1/2014 | Oren | |
| 2014/0023465 A1 | 1/2014 | Oren et al. | |
| 2014/0034662 A1 | 2/2014 | Chalmers et al. | |
| 2014/0044507 A1 | 2/2014 | Naizer et al. | |
| 2014/0083554 A1 | 3/2014 | Harris | |
| 2014/0093319 A1 | 4/2014 | Harris et al. | |
| 2014/0097182 A1 | 4/2014 | Sheesley | |
| 2014/0166647 A1 | 6/2014 | Sheesley | |
| 2014/0203046 A1 | 7/2014 | Allegretti | |
| 2014/0234059 A1 | 8/2014 | Thomeer | |
| 2014/0321950 A1 | 10/2014 | Krenek et al. | |
| 2015/0004895 A1 | 1/2015 | Hammers et al. | |
| 2015/0069052 A1 | 3/2015 | Allegretti et al. | |
| 2015/0110565 A1 | 4/2015 | Harris | |
| 2015/0159232 A1 | 6/2015 | Zucchi et al. | |
| 2016/0280480 A1 | 9/2016 | Smith et al. | |
| 2017/0129721 A1 | 5/2017 | Harris et al. | |

FOREIGN PATENT DOCUMENTS

| | | |
|---|---|---|
| CN | 201390486 | 1/2010 |
| CN | 201881469 | 6/2011 |
| CN | 103350017 | 10/2013 |
| DE | 3108121 | 9/1982 |
| DE | 3342281 | 6/1985 |
| DE | 4217329 | 5/1993 |
| EP | 0019967 | 12/1980 |
| EP | 322283 | 6/1989 |
| EP | 0564969 | 10/1993 |
| EP | 0997607 | 5/2000 |

(56) References Cited

FOREIGN PATENT DOCUMENTS

| | | |
|---|---|---|
| EP | 1052194 | 11/2000 |
| EP | 1167236 | 1/2002 |
| EP | 1775190 | 4/2007 |
| EP | 2062832 | 5/2009 |
| EP | 2311757 | 4/2011 |
| FR | 2640598 | 6/1990 |
| GB | 1296736 | 11/1972 |
| GB | 2374864 | 10/2002 |
| JP | S4871029 | 9/1973 |
| JP | S4876041 | 9/1973 |
| JP | S58161888 | 10/1983 |
| JP | 1087046 | 4/1998 |
| JP | 10264882 A | 10/1998 |
| MX | 2012011046 | 5/2013 |
| WO | 9202437 | 2/1992 |
| WO | 9301997 | 2/1993 |
| WO | 9306031 | 4/1993 |
| WO | 9908082 | 2/1999 |
| WO | 2006039757 | 4/2006 |
| WO | 2007005054 | 1/2007 |
| WO | 2007061310 | 5/2007 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

International Search Report for related International Application No. PCT/US2013/035442.
International Search Report for related International Application No. PCT/US2013/032819.
International Search Report for PCT/US2015/024810, Jul. 8, 2015. (13 pages).
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, Sep. 23, 2011. (21 pages).
European Search Report for Application No. 15167039.5, Sep. 8, 2015. (7 pages).
International Search Report for PCT/US15/35635, Oct. 30, 2015. (12 pages).
PCT International Search Report for PCT/US15/49074, Dec. 17, 2015. (11 pages).
PCT International Search Report for PCT/US15/57601, May 6, 2016. (11 pages).
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
International Preliminary Report on Patentability for PCT/US2013/032819, Sep. 23, 2016, (6 pages).
Non-Final Office Action Mailed May 13, 2016 for co-pending U.S. Appl. No. 14/986,826.
Final Office Action Mailed Sep. 15, 2016 for co-pending U.S. Appl. No. 14/922,836.
Non-Final Office Action Mailed Feb. 4, 2016 for co-pending U.S. Appl. No. 14/922,836.
Final Office Action Mailed Aug. 25, 2016 for co-pending U.S. Appl. No. 14/927,614.
Non-Final Office Action Mailed Mar. 1, 2016 for co-pending U.S. Appl. No. 14/927,614.
Non-Final Office Action Mailed Apr. 29, 2016 for co-pending U.S. Appl. No. 14/943,182.
Final Office Action Mailed Sep. 15, 2016 for co-pending U.S. Appl. No. 14/882,973.
Non-Final Office Action Mailed Oct. 27, 2016 for co-pending U.S. Appl. No. 15/219,676.
Non-Final Office Action Mailed Nov. 9, 2016 for co-pending U.S. Appl. No. 14/948,494.
Final Office Action Mailed Nov. 4, 2016 for co-pending U.S. Appl. No. 14/738,485.
Non-Final Office Action Mailed Dec. 28, 2016 for co-pending U.S. Appl. No. 13/628,702.
Non-Final Office Action Mailed Jan. 13, 2017 for co-pending U.S. Appl. No. 14/923,920.
Final Office Action Mailed Jan. 12, 2017 for co-pending U.S. Appl. No. 14/841,942.
Non-Final Office Action Mailed Dec. 23, 2016 for co-pending U.S. Appl. No. 14/485,686.
Non-Final Office Action Mailed Jan. 27, 2017 for co-pending U.S. Appl. No. 14/485,687.
Non-Final Office Action Mailed Dec. 20, 2016 for co-pending U.S. Appl. No. 14/831,924.
Final Office Action Mailed Jan. 19, 2017 for co-pending U.S. Appl. No. 13/660,855.
Final Office Action Mailed Nov. 25, 2016 for co-pending U.S. Appl. No. 15/152,744.
Non-Final Office Action Mailed Dec. 15, 2016 for co-pending U.S. Appl. No. 14/848,447.
Non-Final Office Action Mailed Dec. 9, 2016 for co-pending U.S. Appl. No. 14/927,614.
International Search Report for PCT Application No. PCT/US2016/050859 mailed Dec. 9, 2016.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Arrows Up, Inc., Jumbo BTS—Bulk Transport System, Aug. 1, 2014.
Arrows Up, Inc., Reusable Packaging Association, Member Spotlight: John Allegrelli, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Non-Final Office Action Mailed Feb. 11, 2016 for co-pending U.S. Appl. No. 14/882,973.
Non-Final Office Action Mailed Aug. 11, 2016 for co-pending U.S. Appl. No. 13/625,675.
Final Office Action Mailed Nov. 11, 2015 for co-pending U.S. Appl. No. 13/625,675.
Non-Final Office Action Mailed Mar. 11, 2015 for co-pending U.S. Appl. No. 13/625,675.
Final Office Action Mailed Jun. 21, 2016 for co-pending U.S. Appl. No. 13/628,702.
Non-Final Office Action Mailed Feb. 23, 2016 for co-pending U.S. Appl. No. 13/628,702.
Final Office Action Mailed Sep. 22, 2015 for co-pending U.S. Appl. No. 13/628,702.
Non-Final Office Action Mailed Jul. 28, 2015 for co-pending U.S. Appl. No. 13/628,702.
Final Office Action Mailed Mar. 24, 2015 for co-pending U.S. Appl. No. 13/628,702.
Non-Final Office Action Mailed Sep. 18, 2014 for co-pending U.S. Appl. No. 13/628,702.

(56) References Cited

OTHER PUBLICATIONS

Final Office Action Mailed Jun. 27, 2016 for co-pending U.S. Appl. No. 14/831,924.
Non-Final Office Action Mailed Feb. 16, 2016 for co-pending U.S. Appl. No. 14/831,924.
Final Office Action Mailed Jun. 27, 2016 for co-pending U.S. Appl. No. 14/923,920.
Non-Final Office Action Mailed Feb. 9, 2016 for co-pending U.S. Appl. No. 14/923,920.
Final Office Action Mailed Sep. 15, 2016 for co-pending U.S. Appl. No. 14/943,111.
Non-Final Office Action Mailed Apr. 5, 2016 for co-pending U.S. Appl. No. 14/943,111.
Final Office Action Mailed Jul. 18, 2016 for co-pending U.S. Appl. No. 14/948,494.
Non-Final Office Action Mailed Apr. 8, 2016 for co-pending U.S. Appl. No. 14/948,494.
Non-Final Office Action Mailed Sep. 6, 2016 for co-pending U.S. Appl. No. 15/144,296.
Non-Final Office Action Mailed Jul. 25, 2016 for co-pending U.S. Appl. No. 13/660,855.
Final Office Action Mailed Apr. 28, 2016 for co-pending U.S. Appl. No. 13/660,855.
Non-Final Office Action Mailed Oct. 6, 2015 for co-pending U.S. Appl. No. 13/660,855.
Final Office Action Mailed Aug. 6, 2015 for co-pending U.S. Appl. No. 13/660,855.
Non-Final Office Action Mailed Apr. 29, 2015 for co-pending U.S. Appl. No. 13/660,855.
Final Office Action Mailed Dec. 17, 2014 for co-pending U.S. Appl. No. 13/660,855.
Non-Final Office Action Mailed Sep. 4, 2014 for co-pending U.S. Appl. No. 13/660,855.
Final Office Action Mailed Sep. 24, 2013 for co-pending U.S. Appl. No. 13/660,855.
Non-Final Office Action Mailed May 14, 2013 for co-pending U.S. Appl. No. 13/660,855.
Non-Final Office Action Mailed Jul. 5, 2016 for co-pending U.S. Appl. No. 14/996,362.
Non-Final Office Action Mailed Jul. 6, 2016 for co-pending U.S. Appl. No. 15/144,450.
Final Office Action Mailed Sep. 29, 2016 for co-pending U.S. Appl. No. 13/768,962.
Non-Final Office Action Mailed Apr. 5, 2016 for co-pending U.S. Appl. No. 13/768,962.
Final Office Action Mailed Oct. 9, 2015 for co-pending U.S. Appl. No. 13/768,962.
Non-Final Office Action Mailed May 1, 2015 for co-pending U.S. Appl. No. 13/768,962.
Non-Final Office Action Mailed Jul. 18, 2016 for co-pending U.S. Appl. No. 15/152,744.
Non-Final Office Action Mailed Apr. 13, 2016 for co-pending U.S. Appl. No. 14/738,485.
Non-Final Office Action Mailed Sep. 7, 2016 for co-pending U.S. Appl. No. 14/841,942.
Final Office Action Mailed May 12, 2016 for co-pending U.S. Appl. No. 14/841,942.
Non-Final Office Action Mailed Nov. 30, 2015 for co-pending U.S. Appl. No. 14/841,942.
Non-Final Office Action Mailed Jul. 21, 2016 for co-pending U.S. Appl. No. 15/083,596.
Non-Final Office Action Mailed Aug. 19, 2016 for co-pending U.S. Appl. No. 15/084,611.
Non-Final Office Action Mailed Sep. 6, 2016 for co-pending U.S. Appl. No. 15/143,942.
Final Office Action Mailed Sep. 1, 2016 for co-pending U.S. Appl. No. 14/848,447.
Non-Final Office Action Mailed Apr. 8, 2016 for co-pending U.S. Appl. No. 14/848,447.
Non-Final Office Action Mailed Feb. 24, 2017 for co-pending U.S. Appl. No. 14/943,182.
Non-Final Office Action Mailed Feb. 14, 2017 for co-pending U.S. Appl. No. 14/943,111.
Final Office Action Mailed Mar. 7, 2017 for co-pending U.S. Appl. No. 15/144,296.
Non-Final Office Action Mailed Apr. 6, 2017 for co-pending U.S. Appl. No. 13/768,962.
Non-Final Office Action Mailed Mar. 6, 2017 for co-pending U.S. Appl. No. 15/152,744.
International Search Report and Written Opinion for PCT/US2017/012271, May 22, 2017.
Non-Final Office Action Mailed Apr. 24, 2017 for co-pending U.S. Appl. No. 14/738,485.
Final Office Action Mailed May 4, 2017 for co-pending U.S. Appl. No. 15/143,942.
Final Office Action Mailed May 30, 2017 for co-pending U.S. Appl. No. 13/625,675.
Final Office Action Mailed Apr. 19, 2017 for co-pending U.S. Appl. No. 15/219,640.
Non-Final Office Action Mailed Jun. 1, 2017 for co-pending U.S. Appl. No. 15/219,640.
Final Office Action Mailed May 2, 2017 for co-pending U.S. Appl. No. 15/219,676.
Non-Final Office Actions Mailed May 10, 2017 for co-pending U.S. Appl. No. 14/882,973.

* cited by examiner

PROPPANT DISCHARGE SYSTEM HAVING A CONTAINER AND THE PROCESS FOR PROVIDING PROPPANT TO A WELL SITE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to storage containers. More particularly, the present invention the relates to proppant discharge systems wherein proppant can be discharged from the storage container. Additionally, the present invention relates to a process for providing proppant to a well site by the transport and delivery of the proppant containers.

2. Description of Related Art Including Information Disclosed Under 37 CFR 1.97 and 37 CFR 1.98

Hydraulic fracturing is the propagation of fractions in a rock layer caused by the presence of pressurized fluid. Hydraulic fractures may form naturally, in the case of veins or dikes, or may be man-made in order to release petroleum, natural gas, coal seam gas, or other substances for extraction. Fracturing is done from a wellbore drilled into reservoir rock formations. The energy from the injection of a highly-pressurized fracking fluid creates new channels in the rock which can increase the extraction rates and ultimate recovery of fossil fuels. The fracture width is typically maintained after the injection by introducing a proppant into the injected fluid. Proppant is a material, such as grains of sand, ceramic, or other particulates, that prevent the fractures from closing when the injection is stopped.

With the rise of hydraulic fracturing over the past decade, there is a steep climb in proppant demand. Global supplies are currently tight. The number of proppant suppliers worldwide has increased since 2000 from a handful to well over fifty sand, ceramic proppant and resin-coat producers.

By the far the dominant proppant is silica sand, made up of ancient weathered quartz, the most common mineral in the Earth's continental crust. Unlike common sand, which often feels gritty when rubbed between the fingers, sand used as a proppant tends to roll to the touch as a result of its round, spherical shape and tightly-graded particle distribution. Sand quality is a function of both deposit and processing. Grain size is critical, as any given proppant must reliably fall within certain mesh ranges, subject to downhole conditions and completion design. Generally, coarser proppant allows the higher flow capacity due to the larger pore spaces between grains. However, it may break down or crush more readily under stress due to the relatively fewer grain-to-grain contact points to bear the stress often incurred in deep oil- and gas-bearing formations.

Typically, in any hydraulic fracturing operation, a large amount of such proppant is required. Typically, it has been difficult to effectively store the proppant at the fracturing sites. Additionally, it has been found to be rather difficult to effectively transport the proppant to the desired location. Often, proppant is hauled to the desired locations on the back of trucks and is dumped onsite. Under such circumstances, the proppant is often exposed to adverse weather conditions. This will effectively degrade the quality of the proppant during its storage. Additionally, the maintenance of proppant in containers at the hydraulic fracturing site requires a large capital investment in storage facilities. Typically, the unloading of such storage facilities is carried out on a facility-by-facility basis. As such, there is a need to be able to effectively transport the proppant to and store the proppant in a desired location adjacent to the hydraulic fracturing location.

U.S. patent application Ser. No. 13/427,140, filed on Mar. 22, 2012 by the present inventor, describes a system of the delivery of proppant between a loading station and the well site. This application describes the steps of placing the storage container in a location adjacent to a train site such that the proppant, as delivered by the train, can be discharged into the container. The container can then be transported for storage in stacks at the loading area or can be delivered to a tilting mechanism at the loading station. The tilting station will tilt the container so as to allow the proppant to flow outwardly therefrom. This proppant will flow, by a conveyor, to a pneumatic truck. The truck can then transport the proppant over the highways to the well site. At the well site, the proppant from the pneumatic truck can then be discharged into a twenty foot container at the well site. These twenty foot containers can be stored at the well site in a stacked configuration. Ultimately, each of the containers can be transported to another tilting mechanism at the well site so that the proppant within each of the storage container can be discharged onto a conveyor and ultimately for use during the fracturing operation.

One of the problems with this system is that each of the containers is handled by various types of equipment and at multiple times. Ultimately, heavy-duty equipment is required to move a twenty foot container that is filled with proppant from one location to another. This heavy-duty equipment can be extremely expensive. Additionally, since the container, along with the proppant therein, is subject to repeated handling, there is a possibility of degradation of the proppant within the container. Ultimately, every time the proppant is loaded, discharged, loaded again, and then discharged, it is subject to wear-and-tear and degradation. As such, a need has developed so as to avoid the multiple handlings of the proppant and the proppant storage container.

In normal use, a twenty foot container can hold 96,000 pounds of proppant. However, weight limits imposed on trucks by highway authorities limit the amount of weight that can be carried to 48,000 pounds. As such, in order to comply with the law, it is only possible to pour approximately 45,000 pounds of proppant into the container. This only partially fills the container and leaves a great deal of wasted space within the container. As such, it has been felt to be impractical to utilize transported containers to move the proppant from the loading station directly to the well site.

Whenever a twenty foot container is loaded with proppant, the proppant tends to pile up in a pyramid shape. As such, there is a great deal of wasted space within the container. If the container is not tilted at a rakish angle, there will always remain a certain quantity of proppant that remains within the container. It was not felt possible to place an outlet at the floor of the container since such an outlet on a twenty foot container would be ineffective in allowing the proppant to be discharged fully from the interior of such a container.

Demurrage is continual problem for well-site operators. Demurrage is the charge, by the trucking companies, of having the truck in a position waiting for loading or discharging. In other words, demurrage covers the idle time associated with a truck on a particular project. If trucks were used so as to move the twenty foot container from the loading station at a drill site, each of the trucks would have to wait until the proppant was required at the drill site. At that time, the container can be removed from the truck and positioned so as to be discharged. Ultimately, the truck would have to wait until the container was fully discharged before it could take the empty container back to the loading station. This waiting time significantly increases the cost of demurrage to the well-site operators. Additionally, and furthermore, as the containers are being loaded at the loading station, each of the trucks will have wait in order to receive a particular load. As such, it is often felt possible to properly use the typical twenty foot storage containers for proppant delivery and storage.

In the past, various patents have issued relating to storage and transport facilities. For example, U.S. Patent Publication No. 2008/0179054, published on Jul. 31, 2008 to McGough et al., shows a bulk material storage and transportation system. In particular, the storage system is mounted on the trailer of a truck. The storage system includes walls that define an interior volume suitable for receiving the aggregate material therein. There are hoppers provided at the bottom of the container. These hoppers have inclined walls. The hoppers can extend so as to allow the material from the inside of the container to be properly conveyed to a location exterior of the container. Actuators are used so as to expand and collapse the container.

U.S. Pat. No. 7,240,681, issued on Jul. 10, 2007 to L. Saik, describes a trailer-mounted mobile apparatus for dewatering and recovering formation sand. The trailer is mounted to a truck-towable trailer so as to receive sand therein. The container has a pair of sloping end walls. The back end of the container is suitably openable so as to allow the sand to be removed therefrom. A pneumatic or hydraulic ram is provided on the forward part of the container so as to allow the container to be lifted angularly upwardly so as to allow sand to be discharged through the gate at the rear of the container.

U.S. Pat. No. 4,247,228, issued on Jan. 27, 1981 to Gray et al., describes a dump truck or trailer with a pneumatic conveyor. The container is mounted to a frame on wheels. A hydraulic ram tilts the container for dumping through a rear outlet. A pneumatic conveyor is carried by the frame with an intake at the rear of the container. A gate allows the solids to be dumped conventionally by gravity or to be blown to a storage facility by the pneumatic container. The container has a top hatch formed therein so as to allow the solids to be introduced into the interior of the container.

U.S. Pat. No. 2,865,521, issued on Dec. 23, 1958 to Fisher et al., shows a bulk material truck that has an interior volume suitable for the receipt of bulk material therein. A pneumatic conveyer is utilized so as to allow the removal of such material from the bottom of the container. A pair of sloping walls are provided on opposite sides of the container so as to allow the bulk material within the container to be passed toward the bottom of the container. A top hatch is provided on the top of the conveyer. The pneumatic conveyer is connected to the bottom of the container.

It is an object of the present invention to provide a proppant storage container that allows proppant to be easily transported and stored.

It is another object of the present invention to provide a proppant storage container that allows the proppant to be easily and efficiently discharged to the bottom of the container.

It is another object of the present invention to provide a proppant storage container which allows for the effective storage of proppant at the fracturing site.

It is another object of the present invention to provide a process for delivering proppants that eliminates the use of pneumatic trailers.

It is further object of the present invention to provide a proppant storage container and a process for delivering proppant in which of the containers can be moved by a simple forklift.

It is another object of the present invention to provide a process for delivering proppants which effectively eliminates demurrage associated with the loading station and at the well site.

It is a further object of the present invention to provide a process of the deliver proppant which avoids the degradation of the proppant as a result of repeated handling.

It is a further object of the present invention to provide a proppant discharge system which provides a premeasured amount of proppant to the drill site.

It is still another object of the present invention to provide a proppant container which satisfies highway regulation and which has less void space within the interior of the container.

These and other objects and advantages of the present invention will become apparent from a reading of the attached specification and appended claims.

BRIEF SUMMARY OF THE INVENTION

The present invention is a container for the transport and storage of proppant. The container comprises a box having a floor and pair of side walls and a pair of end walls and a top. The box has an inlet formed at or adjacent to the top. The box has an outlet formed at the floor thereto. A gate is affixed at the outlet and positioned on the floor and within the container. The gate is movable in a vertical direction between a first position covering the outlet to a second position opening the outlet.

In the container of the present invention, a first ramp is affixed to the floor of the box adjacent one side of the outlet. This first ramp extends angularly upwardly from the outlet toward one of the pair of end walls. A second ramp is affixed to the floor of the box adjacent an opposite side of the outlet. This second ramp extends angularly upwardly from the outlet toward another the pair of end walls. A cage is affixed onto the floor of the box in a positioned over the outlet. This cage has a slotted opening on a surface thereof. The gate is positioned within the cage so as to have a surface covering the slotted opening when the gate is in the first position. The surface of the gate opens the slotted opening when the gate is in the second position. In the preferred embodiment of the present invention, the cage has a rectangular configuration having a plurality of sides. Each side of the plurality of sides of the cage has the slotted opening formed therein. The plurality of sides extend in transverse relationship to the floor of the box. The gate has a plurality of sides respectively covering the slotted opening of the plurality of sides of the cage when the gate is in the first position. A cover extends over a top of the cage. This cover is positioned above the slotted opening. The cover will have an inverted V-shape exterior surface.

In the present invention, the container is known as a ten foot ISO container. In other words, the container has a length of ten feet and a width dimension of eight feet and a height of eight and one-half feet. This container can receive approximately 45,000 pounds of proppant therein.

The present invention is also a proppant discharge system that comprises a container having a floor and a pair of side walls and a pair of end walls and top, and a support structure having a top surface and at least one actuator affixed thereto. The container is removably positioned on the top surface of the support structure. The container has a gate affixed to the outlet and positioned on the floor within the container. The gate is movable between a first position covering the outlet to a second position opening the outlet. The actuator of the support structure is positioned so as to move the gate between the first position to the second position.

In one embodiment of the present invention, a conveyor underlies the top surface of the support structure so as to receive proppant as discharged from the outlet of the container when the gate is moved by the actuator to the second position. The support structure has a frame extending in a horizontal plane. The top surface is formed on this frame. A plurality of legs extend downwardly from the frame so as to support the frame above an underlying surface. The actuator extends across the frame below the top surface thereof.

In another embodiment of the present invention, there is a tubular member that underlies the support structure. The tubular member has a plurality of hoppers communicating therewith. Each of the hoppers is positioned below the outlet of the container. As such, when proppant is discharged from the outlet of the container, the proppant will flow into the hopper and into the tubular member. Compressed air is applied to the tubular member so as to draw the proppant along the length of the tubular member for delivery to a desired location. A Venturi can be incorporated into the tubular member so as to facilitate the delivery of the proppant to the desired location. The tubular member is the nature of a flexible hose. As such, the support structure can be positioned relatively remotely from the well site and the hose extended to a stand storage and conveying facility located at the well site. As such, the support structure of this embodiment of the present invention will not interfere with day-to-day operations at the well site. Additionally, a screw conveyor can be utilized in association with the tubular member instead of compressed air.

The actuator includes a pair of channels that are affixed to and extend downwardly from the frame. A cross member has a first end received in one of the pair of channels and an opposite end received in the other of the pair of channels. An actuator cylinder is received in at least one of the pair of channels. The actuator cylinder is cooperative with the cross member so as to move the cross member between an up position and a down position. At least one arm is affixed to the cross member at a location between the ends thereof. The arm extends upwardly from the cross member. The arm has an end that is suitable for bearing against the gate of the container. The gate is in the first position when the cross member in the down position. The gate is in the second position when the cross member is in the up position. In the preferred embodiment of the present invention, the cross member has a rectangular structure formed centrally between the ends thereof. This rectangular structure has a plurality of corners. The arm comprises a plurality of arms respectively extending upwardly from the plurality of corners.

The container can include a plurality of containers that are removably positioned in side-by-side relationship on the top surface of the support structure. The actuator can include a plurality of actuators positioned so as to be cooperative with the respective gates of the plurality of containers. As such, a multiplicity of the containers can be placed upon the support structure so as to properly deliver measured amounts of proppant, by way of the conveyor or tubular member, to the well site.

The present invention is further a process for providing proppants to a well site. This process includes the steps of: (1) delivering proppant to a loading station; (2) loading a plurality of containers with the delivered proppant at the loading station; (3) transporting the containers to the well site; (4) positioning the plurality of containers on a support structure; and (5) discharging the loaded proppant from the plurality of containers positioned at the well site.

Each of the plurality of containers is a ten foot ISO container. Each of the of the plurality of containers has an outlet at a floor thereof. The step of transporting includes positioning a single container of the plurality of containers on a trailer or bed of a truck, and trucking the single container by the truck from the loading station to the well site.

Each of the loaded containers is moved by a forklift from the loading station onto a trailer or bed of a truck. The loaded container is removed from the trailer or bed of the truck with a forklift. This loaded container is then transported by the forklift to the support structure. The discharged proppant is conveyed from the support structure to the well site.

Alternatively, the discharged proppant can be moved by compressed air or a screw conveyor through a tubular member to a location at the well site.

Each of the plurality of containers has a gate affixed within an exterior of the container at an outlet thereof at a floor of the container. The gate is movable vertically between a first position closing the outlet and a second position opening the outlet. The step of discharging includes applying an upward force to the gate so as to move the gate from the first position to the second position.

The plurality of containers can be stored at the loading station prior to the step of transporting the containers. The discharged containers can be stored at the well site.

Within the concept of the present invention, only a single loaded container can be transported by a truck in order to meet the weight requirements of highway regulations. On the other hand, a plurality of such containers can be placed on the bed or trailer of a truck when the containers have been discharged.

The foregoing section is intended to describe, with particularity, the preferred embodiment of the present invention. It is understood that variations in this preferred embodiment can be made within the scope of the present invention. As such, this section is not intended to be limiting, in any way, of the scope of the present invention. The present invention should only be limited by the following claims and their legal equivalents.

DETAILED DESCRIPTION OF THE INVENTION

Figure 1:
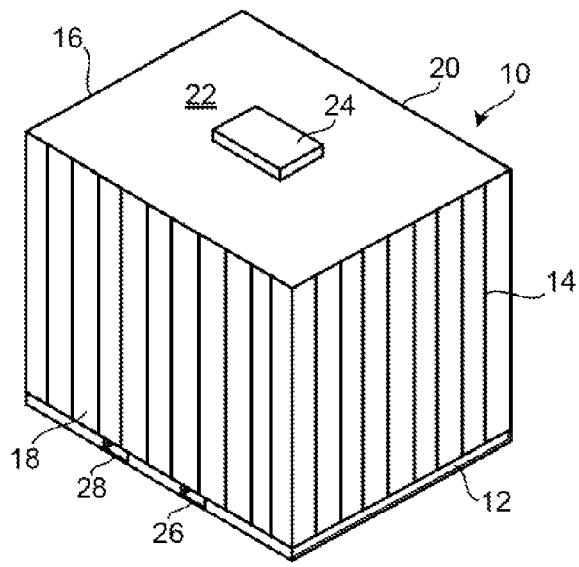
FIG. 1 is a perspective view showing the container of the present invention.

Referring to FIG. 1, there is shown the container 10 in accordance with the preferred embodiment of the present invention. The container 10 that is illustrated is a ten foot container. The container 10 includes a floor 12 having end walls 14 and 16 extending upwardly from the floor. Side walls 18 and 20 also extend upwardly from the floor 12. The end wall 14 extends between side walls 18 and 20. The end wall 16 also extends between side walls 18 and 20 at an opposite end of the floor 12 from end wall 14. A top 22 covers the interior volume of the container 10. The top 22 has an inlet 24 positioned thereof. Inlet 24 can take on a wide variety of configurations. The inlet 24 can also be applied to one of the side walls 18 and 20 or one of the end walls 14 and 16 so as to allow proppant to be introduced into the interior volume of the container 10. It can be seen that the floor 12 includes a pair of fork receptacles 26 and 28 affixed to the floor 12. Fork receptacles 26 and 28 can allow the forks of a forklift to be easily inserted therein so as to allow forklifts to effectively move the container 10 from one location or another.

Typically, containers will have a length of twenty feet and width of ten feet. However, for the purposes of delivering and moving proppant, such twenty foot containers are not practical. When proppant would be introduced into the inlet of a twenty foot container, it would tend to assume a very pyramid-shape arrangement within the interior volume of such a container. As such, there would be a very large amount of void space. Additionally, and furthermore, when a twenty foot container is filled with proppant, it will weigh approximately nine-six thousand pounds. This weight is too great for transport on highways. Highway regulations effectively prevent the movement of such amount of weight thereon. As such, in order to comply with highway requirements, it would be necessary for each twenty foot container to be approximately half-filled. As such, there would be a significant amount of wasted space in such twenty foot container.

The present ten foot ISO container, as shown in FIG. 1, is an ideal solution to the problems associated with twenty foot container. The ten foot ISO container will have a length of ten feet and a width of eight feet and a height of eight and one-half feet. The container 10 can be effectively filled with sand. When container 10 is filled with sand, it will contain approximately forty-five thousand pounds of sand. This is easily within the weight limits of highway regulations. As a result, the ten foot container 10 does not require the accurate measurement of the amount of proppant that is introduced into the interior volume thereof. During the loading of container 10, the proppant is continually delivered into the interior volume of the container 10 until the container is filled. Since the container 10 will weight approximately forty-five thousand pounds, it can be easily manipulated through the use of a standard forklift. As such, the use of heavy-duty equipment is avoided through the use of such a ten foot container. Since the container 10 is substantially filled with sand, it will not have a pyramid shape within the interior volume. Since the interior volume will be substantially filled, there would be very little void space within the interior volume. As a result, sand will be able to be effectively discharged in a smooth and efficient manner from the interior volume of the container 10.

In normal use, a plurality of such containers 10 would be located at a loading station. This loading station can be rail site. A train having hopper cars that carry the proppant can be moved to this loading station. The proppant from the hopper cars can then be discharged, by a conveyor, directly into the inlet 24 of the container 10. This discharging will continue until such time that the container 10 is filled with proppant. As that time, the filled container 10 can then be transported by a forklift from the loading station onto the bed or trailer of a truck. The truck can then transport the filled container 10 to the support structure at the well site. Alternatively, if no trucks are available after the loading of the container 10, the container 10 can be easily placed and stacked at the loading station. As such, they will be conveniently available at such time as a truck arrives at the loading station. Under such a circumstance, the container 10 will be available for loading. This effectively avoids any demurrage associated with a truck waiting to be loaded. Several forklifts could be available at the loading station so as to allow the trucks to be continually loaded with the containers 10.

Figure 2:
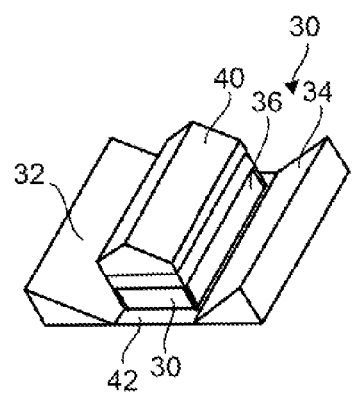
FIG. 2 is a perspective view showing the gate and cage of the container of the present invention.

FIG. 2 shows the unique configuration of the gate system 30 as used within the interior volume of the container 10 at the outlet thereof. The operation of this gate system 30 will be described in greater detail herein in association with illustration with FIGS. 11 and 12. The gate system 30 includes a first ramp 32, a second ramp 34, a cage 36, a gate 38 and a cover 40. The first ramp 32 extends outwardly at an upward angle from the bottom 42. Ram 32 will serve to funnel the proppant toward the outlet. Similarly, ramp 34 extends upwardly at an angle from an opposite side of the gate 38. Ramp 34 is also suitable for funneling the proppant in a direction toward the outlet associated with the gate system 30.

The cage 36 is supported on the bottom 42 of the gate system 30. Cage 36 has a plurality of slotted openings formed therein. In FIG. 2, it can be seen that the gate 38 has covered the slotted openings so that the gate system 30 is closed. The cover 40 is positioned over the cage 36. Cover 40 has an inverted V-shape top surface.

In normal use, when the gate system 30 is placed within the interior of the container 10, a significant amount of sand will reside thereover. The inverted V-shape shape of the cover 40 will tend to deflect the sand in a direction downwardly toward the ramps 32 and 34. The ramps 32 and 34 further direct the sand toward the slotted openings associated with the cage 36. As such, the weigh of the sand will bear against the sides of the gate 38 until such time that the gate 38 is pushed upwardly so that the slotted openings of the cage 36 are open. When the slotted openings of the cage 36 are open, the sand will move downwardly through the openings for discharge.

Figure 3:
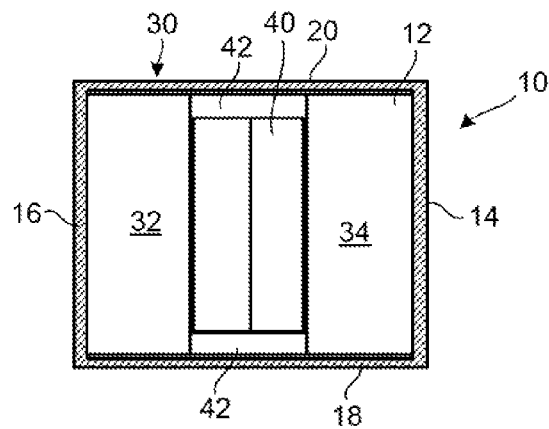
FIG. 3 is a cross-sectional view showing a plan view of the gate and cage arrangement at the outlet of the container of the present invention.

FIG. 3 shows the placement of the gate system 30 on the floor 12 of the container 10. Initially, it can be seen that the first ramp 32 extends from one side of the outlet to the end wall 16. Similarly, the second ramp 34 extends from an opposite side of the outlet to the opposite end wall 14. Each of the ramps 32 and 34 extends across the width of the container 10 between the sides 18 and 20. As such, the ramps 32 and 34 will serve to funnel all of the sand within the container 10 toward the outlet at the floor 12. The cover 40 is illustrated as located centrally between the rams 32 and 34 and as positioned over the gate 38 and the cage 36. Bottom 42 is a flat that will extend from the opposite ends of the gate 38 and the cage 36 to the inside surfaces of the side walls 18 and 20 of the container 10.

Figure 4:
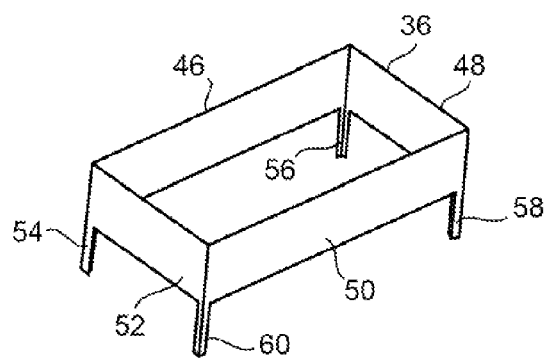
FIG. 4 is a perspective view of the cage as used at the outlet of the container of the present invention.

FIG. 4 shows an isolated view of the cage 36. The cage 36 has sides 46, 48, 50 and 52. A leg 54 extends downwardly at a corner between the sides 46 and 52. A leg 56 extends downwardly at a corner between the sides 46 and 48. A leg 58 extends downwardly from the corner between the sides 48 and 50. Finally, a leg 60 extends downwardly from the corner between the sides 50 and 52. Each of the legs 54, 56, 58 and 60 will have a bottom end that will suitably welded to the bottom 42 of the gate system 30. The side 46, along with the legs 54 and 56, define an slotted opening. Similarly, the side 48, along with the legs 56 and 58, define another slotted opening. Side 50, along with legs 58 and 60, define another slotted opening. The side 52, along with the legs 54 and 60, define a further slotted opening. As such, the slotted openings will appear on all four sides of the cage 36. The sides 46, 48, 50 and 52 define a rectangular shape into which the gate 38 is placed. As such, this area will allow for the upward and downward movement of the gate 38 between a position closing the various slotted openings to a position between the sides 46, 48, 50 and 52 which exposes and opens the slotted openings.

Figure 5:
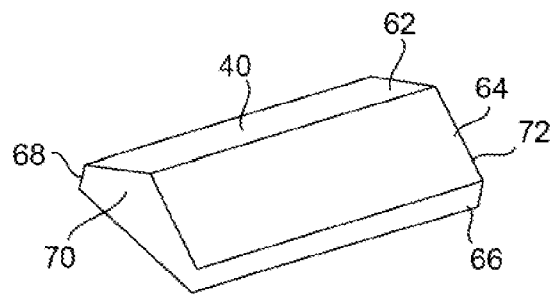
FIG. 5 is a perspective view of the cover as used over the cage at the outlet of the container of the present invention.

FIG. 5 illustrates the cover 40. It can be seen that the cover 40 has a first surface 62 and a second surface 64. Surfaces 62 and 64 are planar surfaces which extend upwardly so as to form an inverted V-shape configuration. The cover 40 will also have side walls 66 and 68 and end walls 70 and 72 which will respectively overlie sides 50, 46, 52 and 48 of the cage 36. The inverted V-shape configuration of the exterior surface of the cover 40 will further facilitate the funneling of the proppant downwardly toward the slotted openings of the cage 36.

Figure 6:
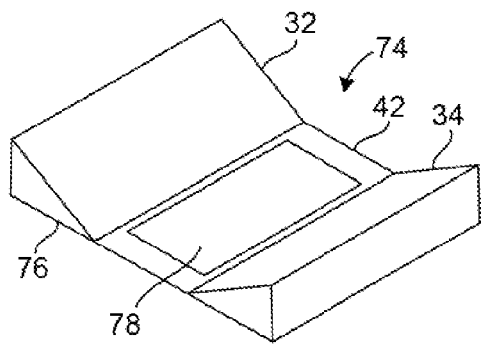
FIG. 6 shows the arrangements of ramps as utilized on the floor of the container of the present invention.

FIG. 6 is an isolated view of the ramp structure 74. The ramp structure 74 is affixed by welding, or other means, to the top surface of the floor 12 of the container 10. As such, the ramp structure 74 will have a flat bottom surface 76. The bottom 42 has a rectangular opening 78 formed therein. Rectangular opening 78 will correspond in size and location to the outlet of the container 10. The first ramp 32 extends upwardly at an angle from one side of the opening 78. The second ramp 34 extends upwardly at an angle from an opposite side of the angle 78. As can be seen, the ramps 32 and 34 serve to funnel the proppant downwardly toward the opening 78 when the ramp structure 74 is installed on the floor 12 of the container 10.

Figure 7:
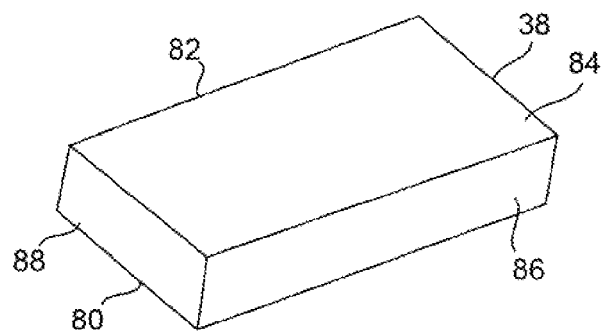
FIG. 7 is a perspective view of the gate of the present invention.

FIG. 7 is an isolated view of the gate 38. The gate 38 has a generally block shape. Gate 38 will have a bottom surface 80 having an area greater than the area of the opening 78 of the ramp structure 74. As a result, the gate 38 will not fall through the opening 78 and through the outlet. The gate 38 has a side 82 which will serve to extend across the slotted opening defined by the side 46 and the legs 54 and 56 of the cage 36. The gate 38 has an end 84 which will cover the slotted opening defined by the side 48 and the legs 56 and 58 of the cage 36. The gate 38 also has another side 86 which will cover the slotted opening defined by the side 50 and the legs 58 and 60 of the cage 36. Additionally, the gate 38 will also have an end 88 which serves to cover the slotted opening defined by the side 52 and the legs 54 and 60 of the cage 36. The corners of the gate 38 will slide along the interior surfaces of the each of the legs 54, 56, 58 and 60 of the cage 36. As such, the block-shape of the gate 38 effectively serves to prevent proppant from passing through the opening 78 and the outlet of the container 10 when it is in a lower position. When the gate 38 is raised to a second position, the side 82, 84, 86 and 88 will expose the slotted opening to the cage 36 so as to allow the proppant to flow therethrough and outwardly through the opening 78 of the ramp structure 74 and the outlet of the container 10.

Figure 8:
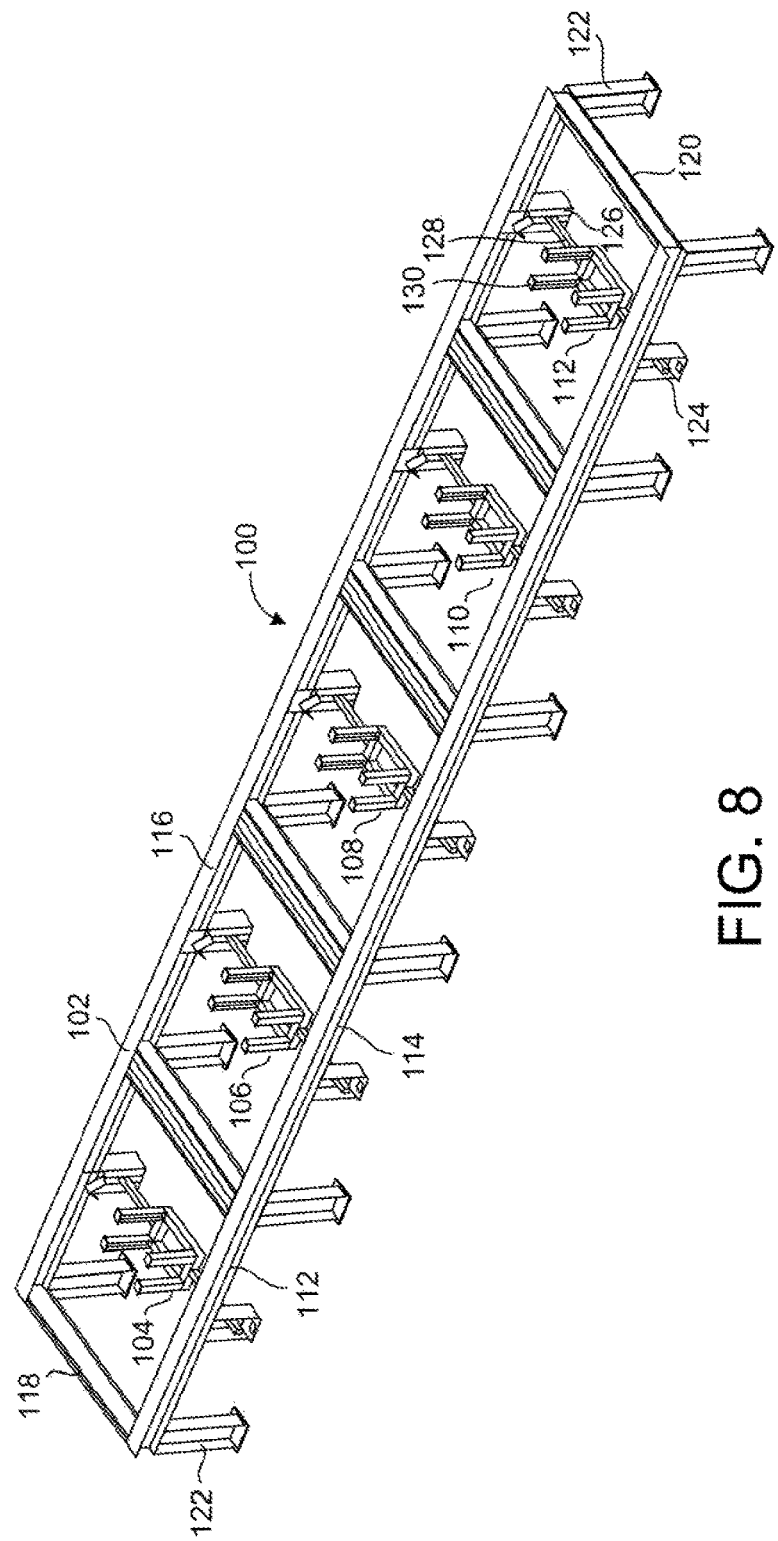
FIG. 8 is a perspective view of the support structure as used for the discharge of proppant in accordance with the preferred embodiment of the present invention.

FIG. 8 shows the support structure 100 of the proppant discharge system of the present invention. The support structure 100 has a top surface 102 suitable for receipt of a plurality of containers 10 thereon. The containers can be removably positioned on this top surface 102 of the support structure 100. The support structure 100 includes actuators 104, 106, 108, 110, and 112. As a result of this arrangement, a total of five containers can be placed in side-by-side relationship from the top surface 102.

The support structure 100 includes a frame 112 that has the top surface 102 thereon. Frame 112 has longitudinal rails 114 and 116 extending in parallel relationship to each other. End rails 118 and 120 extend between the rails 114 and 116 so as to create a rectangular-frame that extends in a horizontal plane. A plurality of legs 122 extends downwardly from the frame 112 so as to support the frame 112 above an underlying surface. It can be seen that the actuators 104, 106, 108, 110 and 112 will extend in spaced parallel relationship to each other between the rails 114 and 116. The actuator 112 is illustrated as having a first channel 124 and a second channel 126 extending downwardly, respectively, from the rails 114 and 116 of frame 102. The actuator 112 will have a cross member 128 extending between each of the channels 124 and 126. A first actuator cylinder can be placed within the channel 124 and a second actuator cylinder can be placed within the channel 126. The actuator cylinders will bear upon the cross member 128 so as to provide the requisite movement of the cross member 128 between a down position and an up position. The actuator 112 includes a plurality of arms 130 which extend upwardly from the cross member 128. The arms 130 will serve to bear on, engage and push upwardly on the gate 38 when the actuator cylinders move the cross member 128 from the down position to the up position. In FIG. 8, each of the actuators 104, 106, 108, and 110 will have a similar configuration to that of actuator 112.

Figure 9:
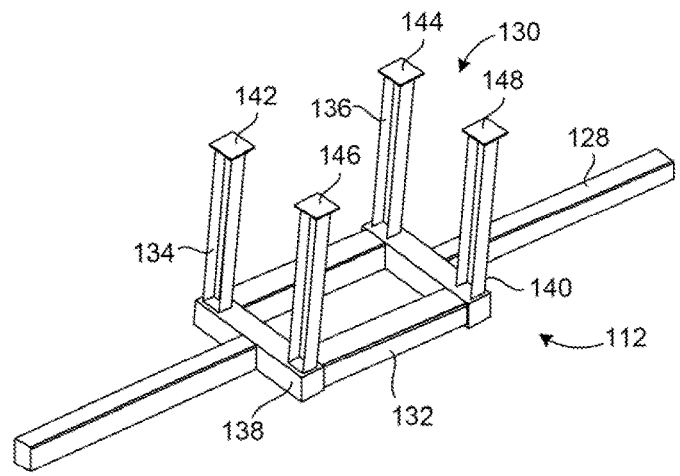
FIG. 9 is isolated perspective view of the actuator arms as used on the support structure of the present invention.

FIG. 9 is detailed view showing the cross member 128 and the arms 130 of actuator 112. As can be seen, there is a rectangular structure 132 formed centrally along the cross member 128 between the channels 124 and 126. The plurality of arms 130 includes a first arm 134, a second arm 136, a third arm 138, and a fourth arm 140. Each of the arms 134, 136, 138 and 140 will extend upwardly from respective corners of the rectangular structure 132. The arms 134, 136, 138 and 140 includes respective flat planar surfaces 142, 144, 146 and 148. These flat surface 142, 144, 146 and 148 will provide a bearing surface against the bottom 80 of the gate 38. As such, when the actuator 112 is moved upwardly, the gate 138 will be lifted evenly throughout the travel of the cross member 128 from the down position to the up position.

Figure 10:
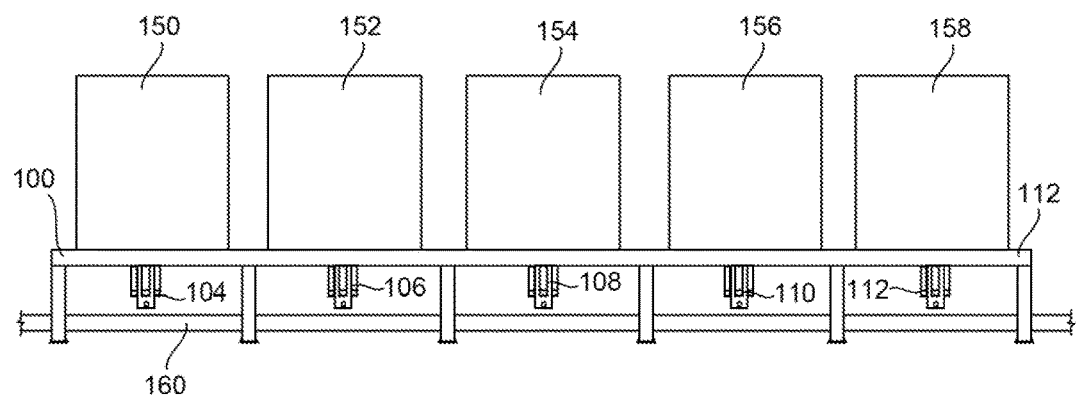
FIG. 10 is a side elevational view showing the placement of multiple containers on the top surface of the support structure of the present invention.

FIG. 10 illustrates that there are a plurality of containers 150, 152, 154, 156 and 158 that have been positioned in side-by-side relationship upon the support structure 100. The actuators 104, 106, 108, 110 and 112 are illustrated as positioned below the frame 112 of the support structure 100. Each of the actuators 104, 106, 108, 110 and 112 is located in correspondence to the gate 38 located in each of the containers 150, 152, 154, 156 and 158. As such, each of the actuators 104, 106, 108, 110 and 112 can be selectively actuated so as to cause the gate 38 to open such that proppant will be released from the interior of each of the containers so as to flow downwardly therefrom. A conveyor 160 extends continuously beneath the support structure 100 so as to allow the sand from the containers 150, 152, 154, 156 and 158 to pass downwardly onto the top surface of the conveyor 160. The conveyor 160 can deliver the proppant from each of the containers to the well site, as desired.

In normal use, the truck can been loaded with a single container 10. The containers 150, 152, 154, 156 and 158 will have a configuration identical to that of container 10. Since each of the containers 150, 152, 154, 156 and 158 have forty-five thousand pounds of proppant therein, only a single container can be transported by a truck along the surface of a highway. The weight of each of the containers will be safely within the weight regulations associated with highways. The weight of each of the containers will prohibit more than one container from being placed upon the bed or trailer of a particular truck.

Once the single container has been placed on the bed or trailer of a truck, the truck can transport the container to the well site. A forklift is located at the well site. This forklift can engage the fork receptacles 26 and 28 on each of the containers so as to move the container from the bed or trailer of the truck to a particular location on the support structure 100. The support structure 100 will allow up to five containers to be placed thereon at a single time. However, within the concept of the present invention, fewer containers can be placed upon the support structure 100. As such, the support structure 100 will allow the well operator to selectively choose the amount of proppant that is delivered by the conveyor 160. For example, if ninety thousand pounds of proppant is required, then two containers can be opened by the actuators so as to receive a measured amount of ninety thousand pounds of proppant. Once the measured amount of proppant has been delivered by way of the conveyor 60, the empty container can then be removed, by a forklift, from the support structure 100. The empty container can then be stacked or stored at the well site. Alternatively, the empty container can then be loaded onto the bed or trailer of any truck that may be at the well site. For example, if the truck has the single filled container removed therefrom, then up to four empty containers can be placed on the bed or trailer of the truck immediately after the loaded container is removed. As a result, the present invention effectively reduces or eliminates any demurrage that may occur by virtue of the truck remaining at the well site. Alternatively, any empty containers that have been stored or stacked at the well site can be immediately placed upon the bed or trailer of the truck once the truck has the filled container removed therefrom.

The remaining filled containers can remain on the support structure 100 until such time as proppant is required. The empty containers can be replaced with filled containers during that time. As such, as illustrated in FIG. 10, the well site will always have filled containers available for providing the measured amount of proppant therefrom.

Figure 11:
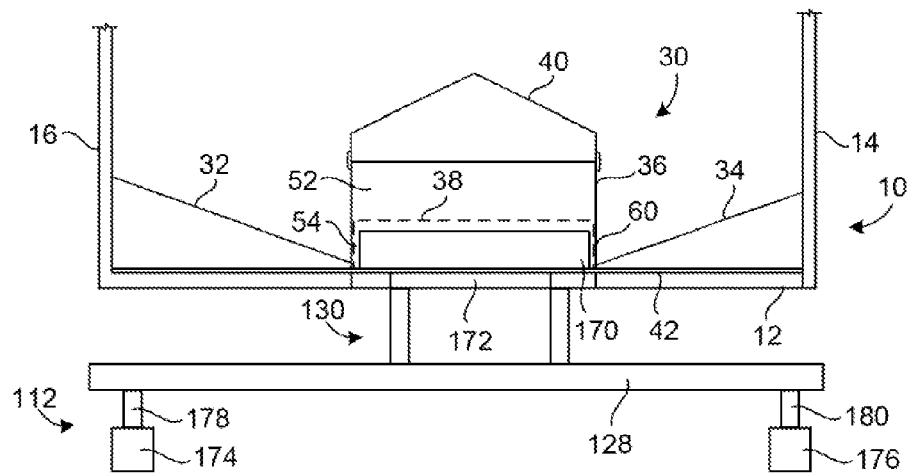
FIG. 11 is side elevational view showing the positioning of the gate in a closed position within the cage in the container of the present invention.

FIG. 11 illustrates the operation of the gate system 30 of the present invention. It can be seen that the gate system 30 has cage 36 affixed to the floor 12 of the container 10. In particular, the gate system 30 will have a bottom 42 that is directly affixed to the floor 12. The cage 36 has a surface 52 which define, along with legs 54 and 60, a slotted opening 170. The gate 38 is illustrated in partial broken line fashion as extending across the slotted opening 170. Ramps 32 and 34 extend downwardly from the respective ends 14 and 16 of the container 10. As such, any proppant that resides upon the inner walls of each of the ends 14 and 16 will flow in a conventional manner downwardly along the surfaces of the ramps 32 and 34 toward the slotted opening associated with the cage 36. Since the gate 38 is illustrated in its first closed position, it is not possible for any proppant to flow outwardly through the outlet 172 at the floor 12 of the container 10. The cover 40 is illustrated as placed upon the top of the cage 36 so as to prevent proppant from entering the interior of the cage 36.

FIG. 11 shows the actuator 112 in the down position. The cylinders 174 and 176 have retracted their respective piston 178 and 180 downwardly such that the cross member 128 is spaced below the floor 12 of the container 10. The arms 130 extend upwardly from the cross member 12 so as to bear upon the under surface of the gate 38. As such, the proppant will be retained within the interior volume of the container 10.

Figure 12:
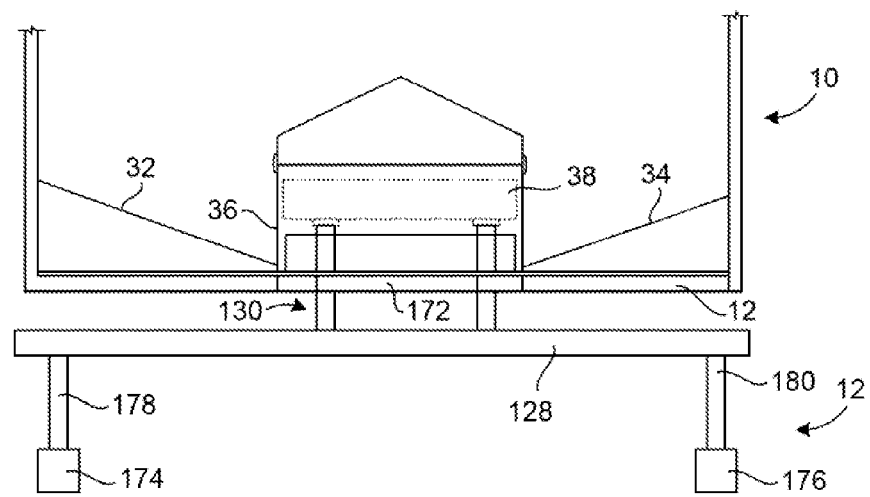
FIG. 12 shows the actuator of the support structure as moving the gate to its discharge position within the cage in the container of the present invention.

FIG. 12 shows the action of the actuator 112 so as to cause the proppant to flow outwardly from the container 10 and onto the conveyor. The cylinders 174 and 176 are actuated such that the respectively pistons 178 and 180 move upwardly. This causes the cross member 128, along with the actuators 130, to also move upwardly. Since each of the actuators 130 bears upon the lower surface of the gate 38, the gate 38 will be pushed upwardly so as to reside within the area defined by the sides 46, 48, 50 and 52 of the cage 36. This will cause the gate 38 to open the slotted openings so as to allow the proppant to flow along the surfaces of the ramps 32 and 34 and outwardly through the outlet 172 at the floor 12 of container 10. In this manner, the container 10 is selectively discharged.

The time that a sufficient amount of proppant has flowed outwardly of the container 10 or at the time that the container 10 is empty, the cylinders 174 and 176 will cause the pistons 178 and 180 to return back to the down position so that the gate 38 will reassume the position as shown in FIG. 11.

Figure 13:
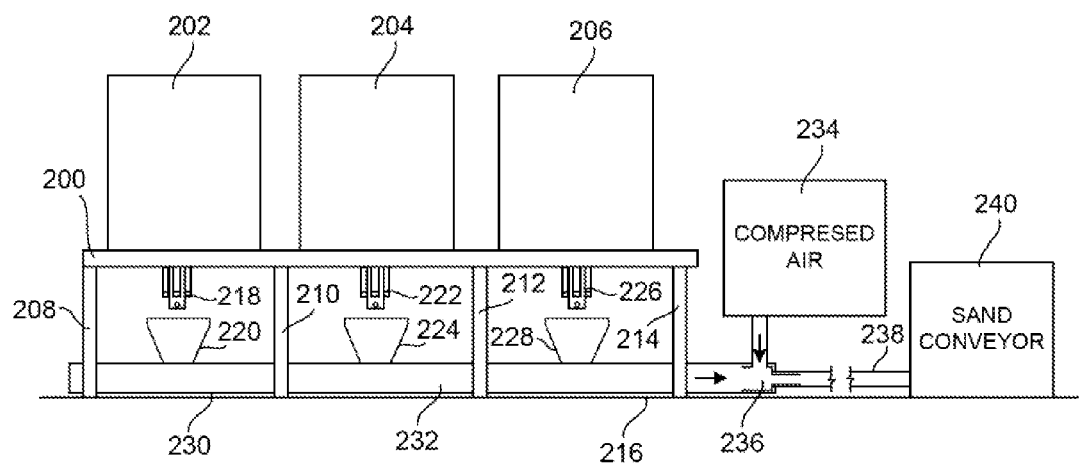
FIG. 13 is a side elevational view showing an alternative embodiment of the system for moving the proppant from the containers to a location at the well site.

FIG. 13 shows an alternative embodiment of the system of the present invention for delivering the proppant to the well site. In FIG. 13, there is shown the support structure 200 having a configuration similar to that of the previous embodiment. Containers 202, 204 and 206 are positioned on appropriate locations on the top surface of the support structure 200. Support structure 200 also has legs 208, 210, 212 and 214 which serves to support the top surface of the support structure 200 a desired distance above the earth 216 (or other underlying surface).

The container 202 is positioned upon the support structure 200 adjacent to the actuator 218. As such, the gauge of the container 202 will be positioned directly above a hopper 220 located below the actuator 218. Similarly, the container 204 is positioned on the support structure 200 above the actuator 222. A hopper 224 will be positioned directly below the gate of the container 204. The container 206 is also positioned on the top surface of the support structure 200 above the actuator 226. A hopper 228 will be positioned directly below the gate of the container 206. Containers 202, 204 and 206 have an identical configuration to the containers described herein previously. Similarly, the actuators 218, 222 and 226 will have a configuration similar to the actuators described hereinabove.

The hoppers 220, 224 and 228 will communicate with the interior of a tubular member 230. The tubular member 230 is in the nature of a hose which will extend along the earth 216 and will extend directly below the top surface of the support structure 200. When the proppant is discharged the gates of container 202, 204 and 206, will flow downwardly into the respective hoppers 220, 224 and 228 so as to be discharged into the interior 232 of the tubular member 230.

In order to move the sand from the interior 232 of the tubular member 230, there is a blower 234 that serves to produce compressed air. Compressed air is directed toward a Venturi 236 so that the forces generated by the Venturi will effectively set the proppant along the tubular member 230 so as to be discharged through a hose 238 to the sand conveyor 240. The sand conveyor 240 can be in the nature of a SAND KING™. These sand conveyors are positioned directly at the well site so as to directly deliver the sand to the well.

In the embodiment of the system of the present invention, as shown in FIG. 13, the support structure 200 can be located a significant distance away from the operations at the well site. As such, the system shown in FIG. 13, is able to avoid the difficulties associated with moving containers and forklifts in the area of the well site operations. The hose 238 can be extended a significant distance away from the sand conveyor 240. As such, the support structure 200 can be safely positioned in a location remote from the well site so that the loading and unloading operations associated with containers 202, 204 and 206 can be carried out without interference to the day-to-day operations of the well.

Various modifications to the system shown in FIG. 13 can be made within the scope of the present invention. In particular, instead of compressed air, a screw conveyor can be utilized in association with the tubular member 230. The screw conveyor will rotate so as to cause the sand, as discharged by containers 202, 204 and 206 to pass therealong and toward the sand conveyor 240. Alternatively, a combination of compressed air and screw conveyor configurations can be made within the scope of the present invention.

The foregoing disclosure and description of the invention is illustrative and explanatory thereof. Various changes in the details of the illustrated construction or in the steps of the described method, can be made within the scope of the appended claims without departing from the true spirit of the invention. The present invention should only be limited by the following claims and their legal equivalents.

I claim:

1. A process for providing fracking proppant to a well site, the process comprising:
   delivering the proppant to a loading station, the proppant having a substantially round, spherical shape and a tightly-graded particle distribution;
   providing a plurality of proppant containers, each of the plurality of proppant containers comprising:
   lateral sidewalls,
   a top,
   a bottom distal from the top,
   an outlet in the bottom,
   ramps extending upwardly at an angle from the bottom toward the lateral sidewalls and each ramp of the ramps terminating at a portion lower than a vertical extent of the lateral sidewalls, the ramps positioned to funnel the proppant toward the outlet along substantially smooth, planar surfaces and being surrounded by the sidewalls extending to the bottom;
   an inner volume defined by the top, bottom and lateral sidewalls enclosing the ramps within the inner volume, and
   a gate adjacent the outlet, the gate being moveable between an open position and a closed position to enable the proppant to flow out of the inner volume;
   loading each of the plurality of containers with the delivered proppant at the loading station, such that the inner volume is substantially filled with proppant, the proppant substantially being evenly distributed in the inner volume of each of the one or more containers upon loading completion;
   transporting each of the plurality of containers to the well site;
   positioning each of the plurality of containers on a top surface of a support structure positioned at the well site, the support structure having spaced apart rails extending continuously from a first end to a second end and being positioned to receive the plurality of the containers thereon at discrete cradles so that the plurality of containers are arranged in a side-by-side arrangement and separately moveable on and off of the support structure; and
   discharging the loaded proppant from one or more of the plurality of containers positioned on the support structure by selectively moving the gate so that the proppant flows from within the inner volume through the outlet.

2. The process of claim 1, wherein the step of transporting the plurality of containers to the well site comprises:
   providing a single container of the plurality of containers on a trailer of a truck at the loading station after the single container is loaded with proppant; and trucking the single container by the truck from the loading station to the well site.

3. The process of claim 2, further comprising:
   storing the plurality of containers at the loading station prior to the step of transporting the containers by stacking a first container of the plurality of containers on top of a second container of the plurality of containers; and
   storing the discharged containers at the well site in a stacked arrangement.

4. The process of claim 1, further comprising:
   moving one of the plurality of containers having proppant stored therein with a forklift from the loading station onto a trailer or a bed of a truck;
   removing the one of the plurality of containers from the trailer or bed of the truck with a forklift; and
   transporting the one of the plurality of containers by the forklift to the support structure to position the one of the plurality of containers directly on the top surface of the support structure and upstream of a conveyor that transports proppant from the one of the plurality of containers to a location at the well site.

5. The process of claim 1, the step of discharging comprising:
discharging the loaded proppant from one or more of the plurality of containers into a hopper, the hopper positionally extending below the support structure.

6. The process of claim 5, the step of discharging further comprising:
discharging the loaded proppant from the hopper into a tubular member.

7. The process of claim 6, the step of discharging further comprising:
applying compressed air to the tubular member so as to draw the proppant along a length of the tubular member for delivery to the well site.

8. The process of claim 6, the step of discharging further comprising:
applying a screw conveyor to the tubular member so as to draw the proppant along a length of the tubular member for delivery to the well site.

9. The process of claim 1, further comprising positioning the plurality of containers on the support structure to align the gate of each of the plurality of containers with one or more actuators, each actuator of the one or more actuators corresponding to one of the plurality of containers, the actuators selectively moving the gate between the open position and the closed position.

10. The process of claim 9, wherein each of the one or more actuators is positioned to be selectively actuated so as to selectively move the gate between the open position and the closed position.

11. The process of claim 1, wherein the step of loading the plurality of containers comprises loading proppant into each of the plurality of containers such that the weight of the proppant loaded into each of the plurality of containers is approximately less than forty-eight thousand pounds and such that each of the plurality of containers is arranged to be shipped on a truck along a highway, and wherein each of the plurality of containers has a length of about ten feet or less, a width of about eight feet or less, and a height of about eight and one-half feet or less so as to accommodate less than approximately forty-eight thousand pounds of the proppant and allow the interior volume to be substantially filled so as to leave little void space.

12. The process of claim 1, wherein the ramps are positioned adjacent the bottom of the container and closely arranged to extend to the outlet, wherein the plurality of containers comprises a multiplicity of containers being positioned in a side-by-side relationship on and spaced-apart along the support structure, and wherein the support structure includes a plurality of rails positioned to create a substantially rectangular-frame that extends in a substantially horizontal plane and onto which the multiplicity of containers is positioned, and a plurality of legs each extending downwardly from the rectangular-frame so as to support the rectangular-frame above an underlying surface when the multiplicity of containers is positioned thereon.

13. The process of claim 1, wherein two or more of the lateral sidewalls include a plurality of vertically extending lateral wall dividers.

14. A process for providing fracking proppant to a well site, the process comprising:
providing a plurality of proppant containers, each of the plurality of proppant containers comprising:
lateral sidewalls, one or more of the lateral sidewalls having one or more lateral wall dividers,
a top,
a bottom distal from the top,
an outlet in the bottom,
ramps extending upwardly at an angle from the bottom toward the lateral sidewalls and each ramp of the ramps terminating at a portion lower than a vertical extent of the lateral sidewalls, the ramps positioned to funnel the proppant toward the outlet;
an inner volume at least partially defined by the top, bottom and lateral sidewalls, and
a gate adjacent the outlet, the gate being moveable between an open position and a closed position to enable the proppant to flow out of the inner volume;
loading each of the plurality of containers with the delivered proppant at the loading station, such that the inner volume is substantially filled with proppant, the proppant substantially being evenly distributed in the inner volume of each of the one or more containers upon loading completion;
positioning each of the plurality of containers on a top surface of a support structure positioned at the well site, the support structure having spaced apart rails extending continuously from a first end to a second end and being positioned to receive the plurality of the containers thereon so that the plurality of containers are arranged in a side-by-side arrangement and separately moveable on and off of the support structure; and
discharging the loaded proppant from one or more of the plurality of containers positioned on the support structure by selectively moving the gate so that the proppant flows from within the inner volume through the outlet.

* * * * *